(12) United States Patent
Liu

(10) Patent No.: US 12,613,547 B2
(45) Date of Patent: Apr. 28, 2026

(54) ELECTRONIC APPARATUS WITH SLIDE-AND-ROTATE HINGE HAVING HEIGHT-ACTUATED LOCK

(71) Applicant: Lenovo (Beijing) Limited, Beijing (CN)

(72) Inventor: Jinpeng Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 80 days.

(21) Appl. No.: 18/176,214

(22) Filed: Feb. 28, 2023

(65) Prior Publication Data

US 2023/0273639 A1     Aug. 31, 2023

(30) Foreign Application Priority Data

Feb. 28, 2022    (CN) .......................... 202210195046.8

(51) Int. Cl.
G06F 1/16          (2006.01)
(52) U.S. Cl.
CPC .................................. G06F 1/1601 (2013.01)
(58) Field of Classification Search
CPC .............................. G06F 1/166; G06F 1/1601
USPC ........ 361/679.6; 428/917–920; 248/917–920
See application file for complete search history.

(56) References Cited

U.S. PATENT DOCUMENTS

| | | | | |
|---|---|---|---|---|
| 9,198,312 | B2 * | 11/2015 | Zhang ................. | H04M 1/0212 |
| 2006/0011788 | A1 * | 1/2006 | Jang ........................ | F16M 11/28 |
| | | | | 248/132 |
| 2007/0064380 | A1 * | 3/2007 | Shin ........................ | F16M 11/24 |
| | | | | 248/917 |
| 2016/0091135 | A1 * | 3/2016 | Chen ....................... | F16M 11/28 |
| | | | | 248/544 |
| 2019/0357368 | A1 * | 11/2019 | Huang .................. | F16M 11/105 |
| 2021/0016720 | A1 * | 1/2021 | Bai ......................... | F16M 11/18 |
| 2022/0117103 | A1 * | 4/2022 | Kang .................... | G06F 1/1681 |
| 2022/0169205 | A1 * | 6/2022 | Moeller .............. | B60R 25/1018 |
| 2023/0280156 | A1 * | 9/2023 | Jaerleberg ............... | E04G 11/06 |
| | | | | 33/301 |

* cited by examiner

*Primary Examiner* — Sagar Shrestha
*Assistant Examiner* — Peter Krim
(74) *Attorney, Agent, or Firm* — ANOVA LAW GROUP, PLLC

(57)          ABSTRACT

An electronic apparatus includes a first body, a second body, and a connection device. The connection device is connected to the first body and the second body and configured to realize a first type movement and a second type movement of the first body relative to the second body. After the first body moves relative to the second body to have a first relative position relationship, the second type movement is realized through the connection device, and the second type movement is different from the first type movement.

19 Claims, 8 Drawing Sheets

ELECTRONIC APPARATUS WITH SLIDE-AND-ROTATE HINGE HAVING HEIGHT-ACTUATED LOCK

CROSS-REFERENCE TO RELATED APPLICATION

This application claims priority to Chinese Patent Application No. 202210195046.8, filed on Feb. 28, 2022, the entire content of which is incorporated herein by reference.

TECHNICAL FIELD

The present disclosure relates to an electronic apparatus.

BACKGROUND

An electronic apparatus is widely used. However, two bodies of the electronic apparatus often have a single type of movement. Thus, the electronic apparatus has poor adaptability.

SUMMARY

Embodiments of the present disclosure provide an electronic apparatus, including a first body, a second body, and a connection device. The connection device is connected to the first body and the second body and configured to realize a first type movement and a second type movement of the first body relative to the second body. After the first body moves relative to the second body to have a first relative position relationship, the second type movement is realized through the connection device, and the second type movement is different from the first type movement.

REFERENCE NUMERALS

100 First body, 103 First support surface, 200 Second body, 201 Sliding chute, 2011 First chute wall, 2012 Second chute wall, 202 Position-limiting hole, 203 Second support surface, 210 Sliding auxiliary structure, 212 Sliding track, 220 Lock auxiliary structure, 221 First inclined surface, 300 Connection device, 310 First connection member, 312 Second rotation member, 3121 First connection hole, 320 Second connection member, 321 Sliding connector, 322 Connector, 3221 Second connection hole, 3222 Shaft body segment, 330 Rotation position-limiting structure, 331 Gap, 332 Protrusion, 340 Lubricating structure, 350 Gasket, 360 Position-limiting member, 400, Lock structure, 410 Position-limiting connector, 411 Pin, 412 Second inclined surface, 420 Elastic member, 500, Prompt structure, 510 First elastic pin, 520 First latch hole, 530 Second latch hole.

DETAILED DESCRIPTION OF THE EMBODIMENTS

In the following description, details are provided in order to provide a thorough understanding of the present disclosure. However, those skilled in the art can understand that only exemplary embodiments of the disclosure are described below. The present disclosure can be implemented without one or more of such details. In addition, to avoid confusion with the present disclosure, some existing technical features are not described in detail.

An electronic apparatus of embodiments of the present disclosure is described in detail below with reference to FIG. 1 to FIG. 9.

Figure 1:
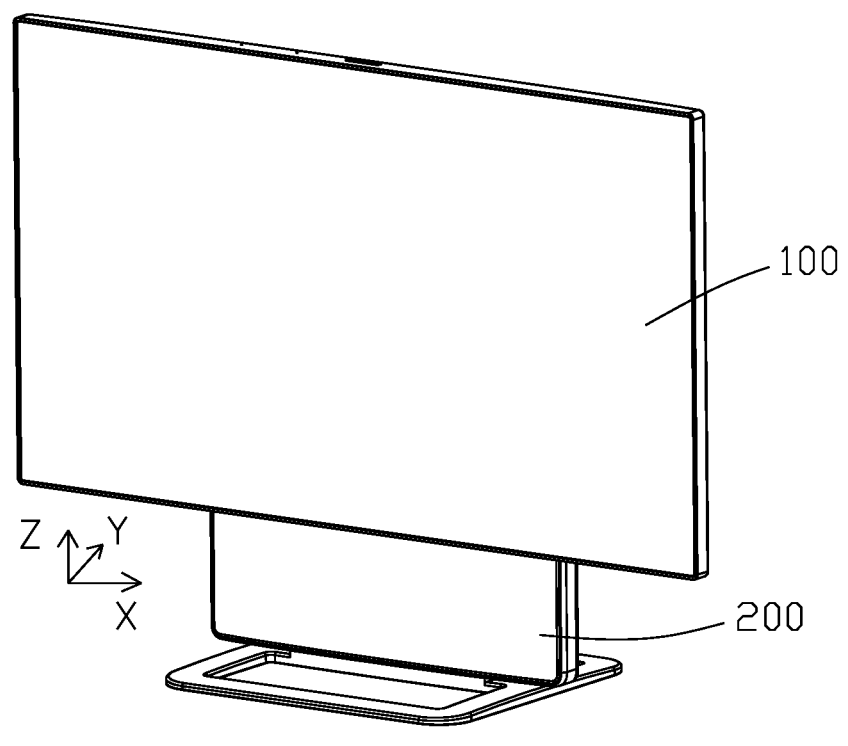
FIG. 1 illustrates a schematic structural diagram of an electronic apparatus (a first body being in a first posture relative to a second body) according to embodiments of the present disclosure.
Figure 2:
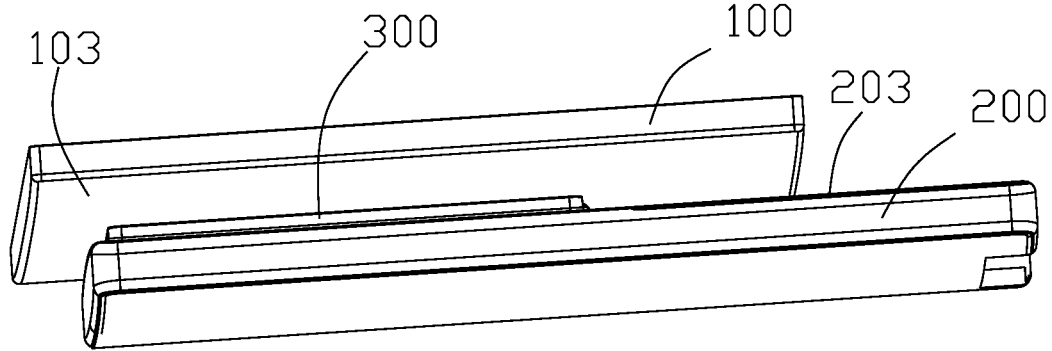
FIG. 2 illustrates a schematic structural diagram of an electronic apparatus according to embodiments of the present disclosure.

As shown in FIG. 1 and FIG. 2, the electronic apparatus includes a first body 100, a second body 200, and a connection device 300. The connection device 300 can be configured to connect the first body 100 and the second body 200 and realize a first type movement and a second type movement of the first body 100 relative to the second body 200. After the first body 100 moves relative to the second body 200 to have a first relative position relationship, the second type movement can be realized through the connection device 300. The second type movement is different from the first type movement. The difference between the second type movement and the first type movement can refer to a different movement direction, a different movement mode, or a different movement direction and a different movement mode. The first relative position relationship can include a distance relationship, an angle relationship, or a position of the center of gravity of the second body 200. The electronic apparatus can connect the first body 100 and the second body 200 through the connection device 300. Thus, the first body 100 can perform the first type movement and the second type movement relative to the second body 200. Moreover, after the first body 100 moves relative to the second body 200 to have the first relative position relationship, the second type movement can be realized, which adds an application mode and increases the adaptability of the electronic apparatus.

In embodiments of the present disclosure, the structure of the electronic apparatus is not limited. For example, the electronic apparatus can include an all-in-one computer, a television, a monitor of a desktop computer, or a laptop computer.

In some embodiments, the structure of the first body 100 is not limited. For example, the first body 100 can have a block structure. For another example, the first body 100 can have a plate-shaped structure. In other embodiments, the first body 100 can also include a display screen, or a display apparatus including a hardware platform and an operating system.

In some embodiments, the structure of the second body 200 is not limited. For example, the second body 200 can have a block structure, and for another example, the second body 200 can have a plate-shaped structure. For still another example, the second body 200 can be a support structure having a base body. Based on the base body, the electronic apparatus can be placed on a carrying surface through the second body 200. The carrying surface can be a desktop or a ground surface.

Figure 3:
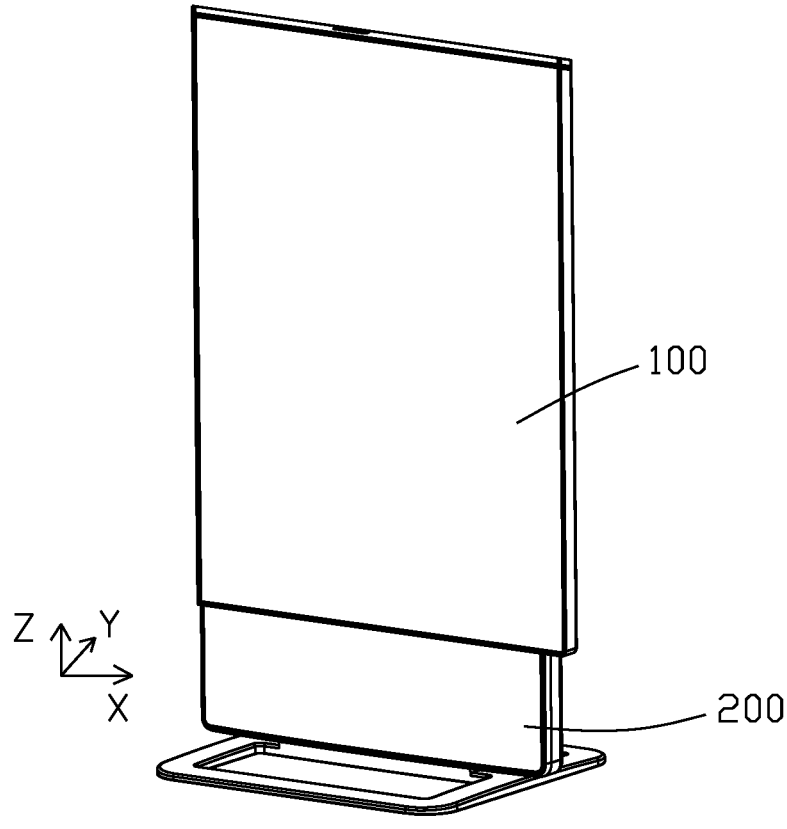
FIG. 3 illustrates a schematic structural diagram of an electronic apparatus (a first body being in a second posture relative to a second body) according to embodiments of the present disclosure.

For example, the second body 200 can be the support structure, and the first body 100 can include the display device. The first body 100 can have a first posture and a second posture relative to the second body 200. The forms of the first posture and the second posture are not limited. For example, as shown in FIG. 1, the first posture is a landscape posture. As shown in FIG. 3, the second posture is a portrait posture.

The structure of the connection device 300 is not limited, as long as the connection device 300 can connect the first body 100 and the second body 200 and can realize the first type movement and the second type movement of the first body 100 relative to the second body 200.

For example, as shown in FIG. 1, the first type movement is a movement in a Z-axis direction. The second type movement is a rotation around a center line parallel to a Y axis on an XZ plane. In some embodiments, the first type movement can be an angular movement in the XZ plane relative to a reference line parallel to a Z axis, and the second type of movement can be a rotation around a center line parallel to the Y axis in the XZ plane. Thus, after the first body 100 moves relative to the second body 200 to have a first distance relationship (for example, after the first body 100 has a specified distance from the carrying surface), the rotation movement can be realized. Based on the first type movement and the second type movement, the first body 100 can ascend and descend relative to the second body 200 in a landscape posture. Moreover, after the first body 100 moves relative to the second body 200 to a specified distance from the carrying surface, the first body 100 can rotate relative to the second body 200 to a portrait posture. Thus, the problem that the first body 100 collides with the carrying surface due to insufficient rotation space in the landscape posture can be avoided.

In some embodiments, the first type movement can be a rotation around a center line parallel to the X axis, and the second type movement can be a rotation around a center line parallel to the Y axis on the XZ plane, Therefore, after the first body 100 rotates relative to the second body 200 around a center line parallel to X axis to have a first angular relationship, the rotation movement around a center line parallel to Y axis can be realized in the XZ plane. Based on the first type movement and the second type movement, the first body 100 can rotate around the center line parallel to the X-axis in the landscape posture, and the first body 100 can rotate to a specified angle relative to the second body 200 (in the specified angle, the first body 100 can have enough rotation space around the center line parallel to Y axis on the XZ plane). Then, the first body 100 can be rotated to the portrait posture relative to the second body 200. Thus, the problem that the first body 100 collides with the carrying surface due to insufficient rotation space in the landscape posture can be avoided.

In some embodiments, the first type is movement can be the movement in the Z-axis direction and the rotation around a center line parallel to the X-axis. The second type movement can be the rotation around a center line parallel to Z-axis. By taking the laptop computer as an example, the first body (the display screen) can perform the first type movement and the second type movement relative to the second body (the host). For example, after the display screen is opened to a certain angle relative to the host through the connection device (first shaft), the display screen can be ascended to a certain distance relative to the carrying surface. Then, the display screen can rotate around a center line parallel to the Z-axis through a connection device (second shaft). Thus, sharing the content displayed on the display screen with other people around the laptop computer can be facilitated.

With still reference to FIG. 1 and FIG. 2, based on the connection device 300, the electronic apparatus is able to be in the first posture. The first body 100 can move relative to the second body 200 to the specified distance from the carrying surface and stop. Then, the first body 100 can rotate relative to the second body 200 to the second posture. When the specified distance is sufficient, the first body 100 can avoid collision with the carrying surface during the rotation of the first body 100 relative to the second body 200, which improves the adaptability of the electronic apparatus.

Figure 4:
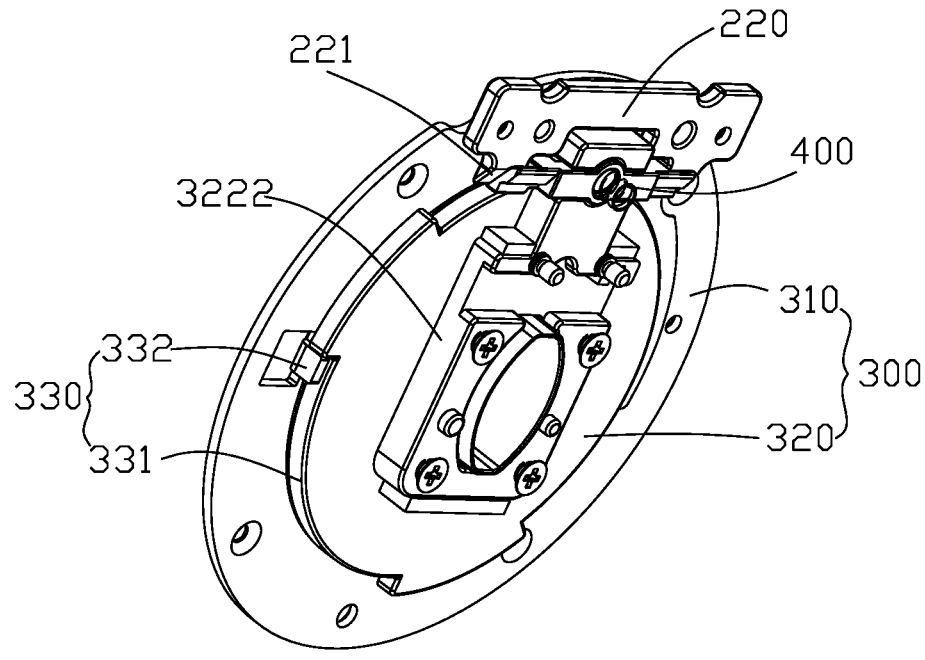
FIG. 4 illustrates a schematic structural diagram of the connection device (connected to a lock structure) in FIG. 2.

As shown in FIG. 4, in embodiments of the present disclosure, the connection device 300 includes a first connection member 310 connected to the first body 100 and a second connection member 320 connected to the second body 200. The second connection member 320 can perform the first type movement relative to the second body 200 to cause the first body 100 to perform the first type movement relative to the second body 200. The first connection member 310 can perform the second type movement relative to the second connection member 320 to cause the first body 100 to perform the second type movement relative to the second body 200.

The structure of the first connection member 310 is not limited, as long as the first connection member 310 can perform the second type movement relative to the second connection member 320. For example, the first connection member 310 can have a circular structure. For another example, the first connection member 310 can have a square structure, or the first connection member 310 can have a ring-shaped structure or a cone-shaped structure.

The structure of the second connection member 320 is not limited, as long as the second connection member 320 can perform the first type movement relative to the second body 200. For example, the second connection member 320 can have a shaft structure, and the first connection member 310 can be sleeved on the shaft structure.

With reference to FIG. 5 and FIG. 7 to FIG. 9, the first type movement is sliding. When the first type movement is sliding, the second connection member 320 can include at least one sliding member 3211. The second body 200 can include a sliding auxiliary structure 210 corresponding to the sliding member 3211. The second connection member 320 can slide relative to the second body 200 through the cooperation of the sliding member 3211 and the sliding auxiliary structure 210.

In some embodiments of the present disclosure, the sliding auxiliary structure 210 can include a sliding track 212 arranged at the second body 200. The sliding member 3211 can include a sliding connector 321 slidingly connected to the sliding track 212. The second connection member 320 can slide relative to the second body 200 through the cooperation of the sliding connector 321 and the sliding track 212.

The structure of the sliding connector 321 is not limited. For example, the sliding connector 321 can have a sheet-shaped structure. For another example, the sliding connector 321 can have a plate-shaped structure.

The position of the sliding connector 321 is not limited either. The first body 100 can include a first support surface 103. The second body 200 can have a second support surface 203 and a third support surface (not marked in the figure) opposite to the second support surface 203. The second support surface 203 can be opposite to the first support surface 103. For example, the sliding connector 321 can slide on the second support surface 203. Thus, the first body 100 and the sliding connector 321 can be located on the same side relative to the second body 200. For another example, the sliding connector 321 can slide on the third support surface 203 of the second body 100. Thus, the first body 100 and the sliding connector 321 can be located on different sides relative to the second body 200. When the first body 100 and the sliding connector 321 are located on different sides relative to the second body 200, a sliding chute 201 can be arranged at the second body 200. The arranged sliding chute 201 may not participate in the sliding cooperation. The sliding chute 201 can be configured to facilitate the connection between the first connection member 310 and the second connection member 320 to cause the first body 100 and the sliding connector 321 to be located on different sides relative to the second body 200.

Figure 8:
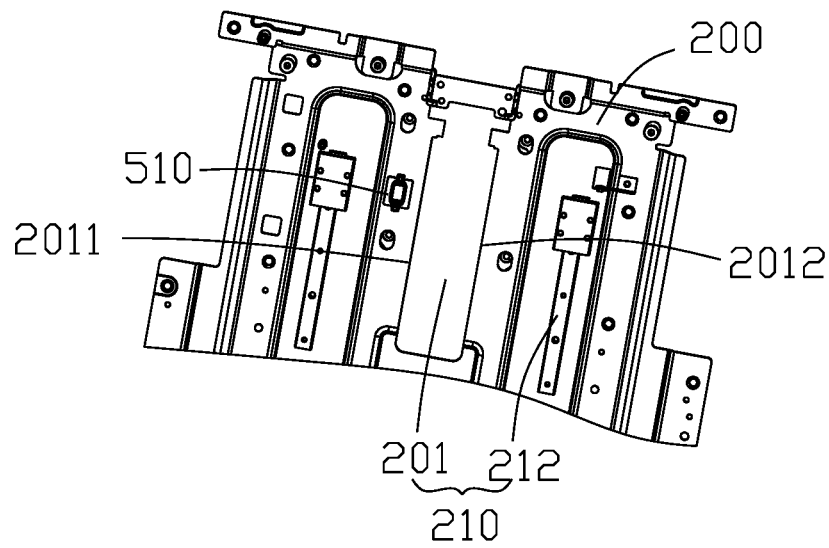
FIG. 8 illustrates a schematic local structural diagram of a second body cooperating with the connection device in FIG. 7.
Figure 9:
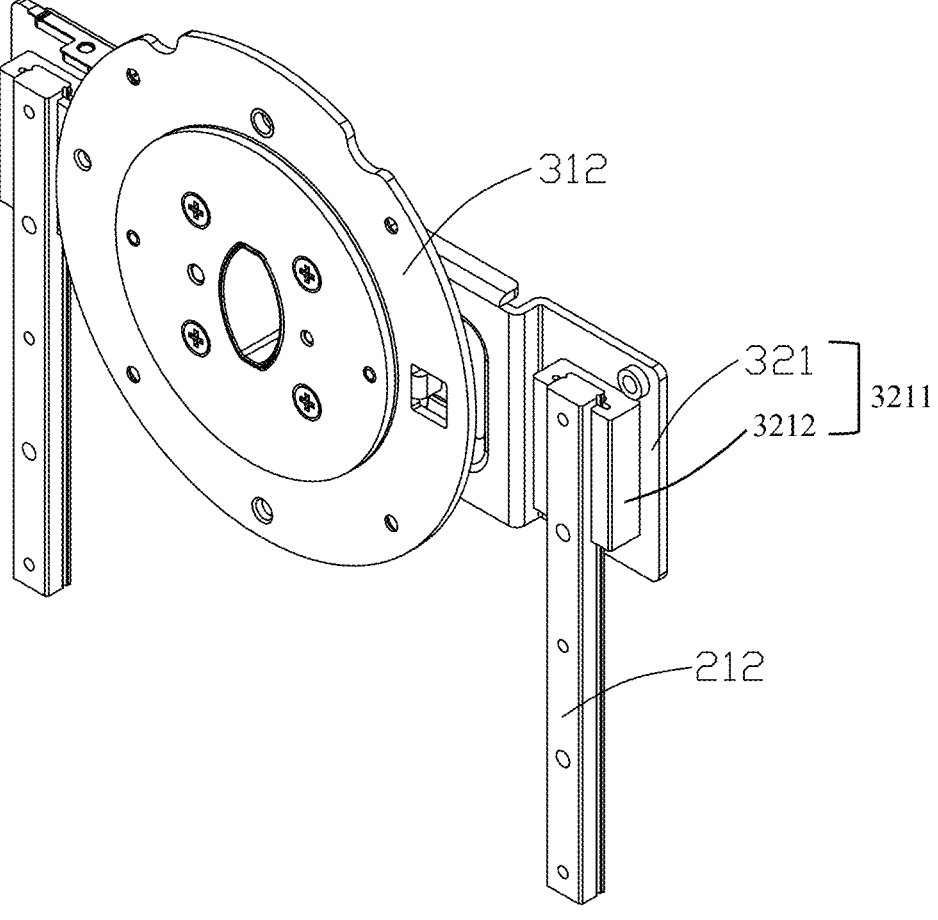
FIG. 9 illustrates a schematic structural diagram of the connection device in FIG. 7 viewing from another direction.

A number of sliding tracks 212 is not limited. For example, as shown in FIG. 8 and FIG. 9, two sliding tracks 212 are provided. Two sides of the sliding connector 321 can slide on the sliding tracks 212 through sliding blocks 3212.

Figure 5:
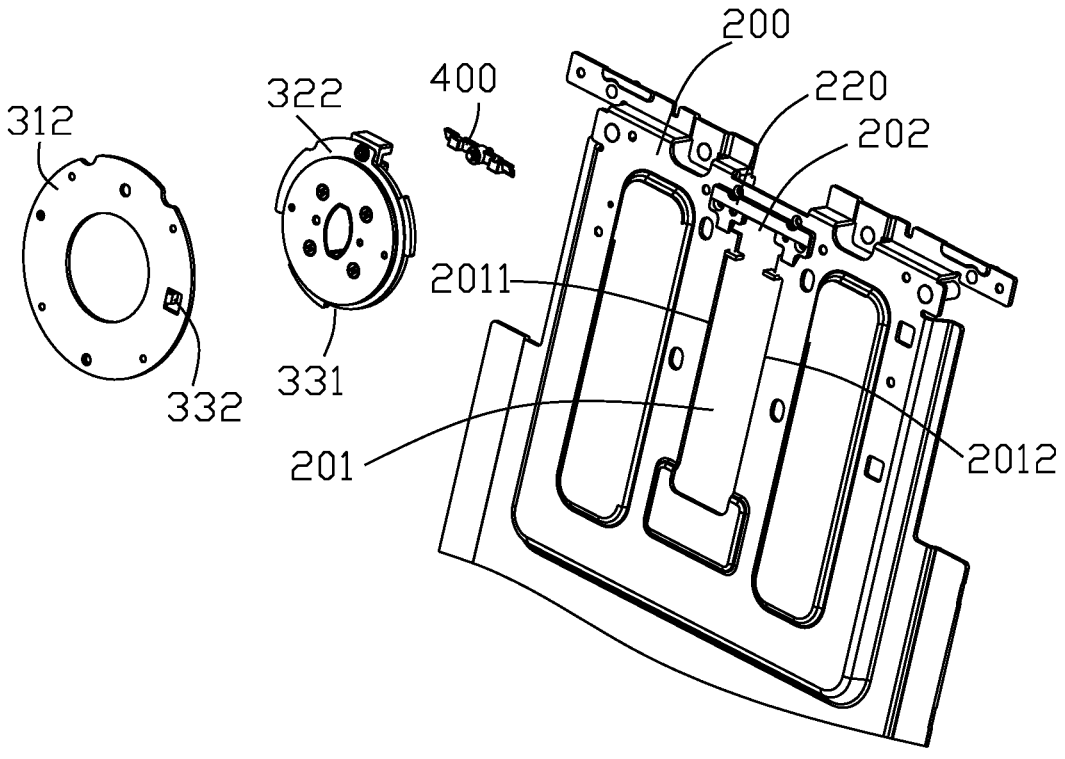
FIG. 5 illustrates a schematic structural diagram showing a connection relationship between the connection device and a second body according to embodiments of the present disclosure.

In some embodiments of the present disclosure, the sliding auxiliary structure 210 can include the sliding chute 201 arranged at the second body 200. The sliding member can include a convex member or a concave member corresponding to the sliding chute 201. The second connection member 320 can slide relative to the second body 200 through the cooperation between the convex member or the concave member and the sliding chute 201. In some embodiments, the shape of the sliding chute 201 is not limited. For example, the sliding chute 201 can be long strip-shaped as shown in FIG. 5 and FIG. 8. The sliding chute 201 can extend along the Z-axis direction at the second body 200 to cause the first type movement to be the movement in the Z-axis direction. For another example, the sliding chute 201 can be long strip-shaped, and the sliding chute 201 can extend along the first direction at the second body 200. The first direction can have an inclined angle with the Z-axis. Thus, the first type movement can be the movement relative to a reference line parallel to the Z-axis on the XZ plane. The sliding chute 201 can include a first chute wall 2011 and a second chute wall 2012 opposite to each other. Two sliding members can be provided. The two sliding members can be slidingly cooperated with the first chute wall 2011 and the second chute wall 2012, respectively.

In some embodiments of the present disclosure, the sliding auxiliary structure 210 can include a sliding chute 201 arranged at the second body 200 and a sliding track 212 arranged at the second body 200. The sliding member can include a sliding connection member 321 slidingly connected to the sliding track 212 and the convex member or the concave member arranged corresponding to the sliding chute 201. The second connection member 320 can cooperate with the sliding chute 201 through the convex member or the concave member. The second connection member 320 can slide relative to the second body 200 through the cooperation between the sliding connection member 321 and the sliding track 212. In some embodiments, the first body 100 and the sliding connection member 321 can be located on the same side or on different sides relative to the second body 200. When the first body 100 and the sliding connector 321 are located on different sides relative to the second body 200, the sliding chute 201 can participate in the sliding cooperation and facilitate the connection between the first connection member 310 and the second connection member 320 to cause the first body 100 and the sliding connector 321 to be located on different sides relative to the second body 200.

Since the second connection member 320 includes at least one sliding member, the second body 200 includes the sliding auxiliary structure 210 corresponding to the sliding member. The second connection member 320 can slide relative to the second body 200 through the cooperation of the sliding part and the sliding auxiliary structure 210 to cause the first body 100 to move relative to the second body 200 to have a first distance relationship.

In some embodiments, the electronic apparatus can further include a damping structure. The damping structure can be arranged between the sliding member and the sliding auxiliary structure 210. The damping structure can be configured to provide a damping force for the sliding member to prevent the connection device 300 from being damaged or the movement of the connection device 300 from being affected due to the first body 100 being heavy.

The damping structure is not limited.

For example, the damping structure can include a friction member arranged at the first chute wall 2011 and the second chute wall 2012 of the sliding chute 201. The friction member can abut against the convex member or the concave member of the sliding member to provide a damping force for the sliding member. The friction member can be a friction protrusion arranged on two opposite side walls of the sliding chute 201 or a rougher surface arranged on the two opposite side walls of the sliding chute 201.

For another example, the damping structure can include a constant force spring. The constant force spring can be arranged on opposite sides of the sliding track 212 to provide the damping force for the sliding connector 321 through the constant force spring.

In some embodiments, a deformation force of the constant force spring can be the same as the gravity of the first body 100 to offset the gravity of the first body 100 through the deformation force of the constant force spring. Thus, the sliding member can move smoothly without a pressing force. Meanwhile, the first body 100 can stop at any position when the first body 100 moves relative to the second body 200.

In some embodiments, the damping structure can also include both the friction member and the constant force spring.

In some embodiments, the first type movement can also be rotation. When the first type movement is rotation, the second connection member 320 can include at least one first rotation member. The second body 200 can include a rotation auxiliary structure corresponding to the first rotation member. The second connection member 320 can rotate relative to the second body 200 through the cooperation of the first rotation member and the rotation auxiliary structure.

In some embodiments, since the second connection member 320 includes at least one first rotation member, and the second body 200 includes the rotation auxiliary structure corresponding to the first rotation member. The second connection member 320 can rotate relatively relative to the second body 200 through the cooperation between the first rotation member and the rotation auxiliary structure. Thus, the first body 100 can rotate relative to the second body 200 to have the first angle relationship. In some embodiments, the electronic apparatus can include the damping structure. The damping structure can be arranged between the first rotation member and the rotation auxiliary member. The damping structure can be configured to provide the damping force for the first rotation member to prevent the connection device 300 from being damaged or the movement of the connection device 300 from being affected due to the first body 100 being heavy. Meanwhile, the first body 100 can stop at any angle when the first body 100 moves to the second body 200.

Figure 6:
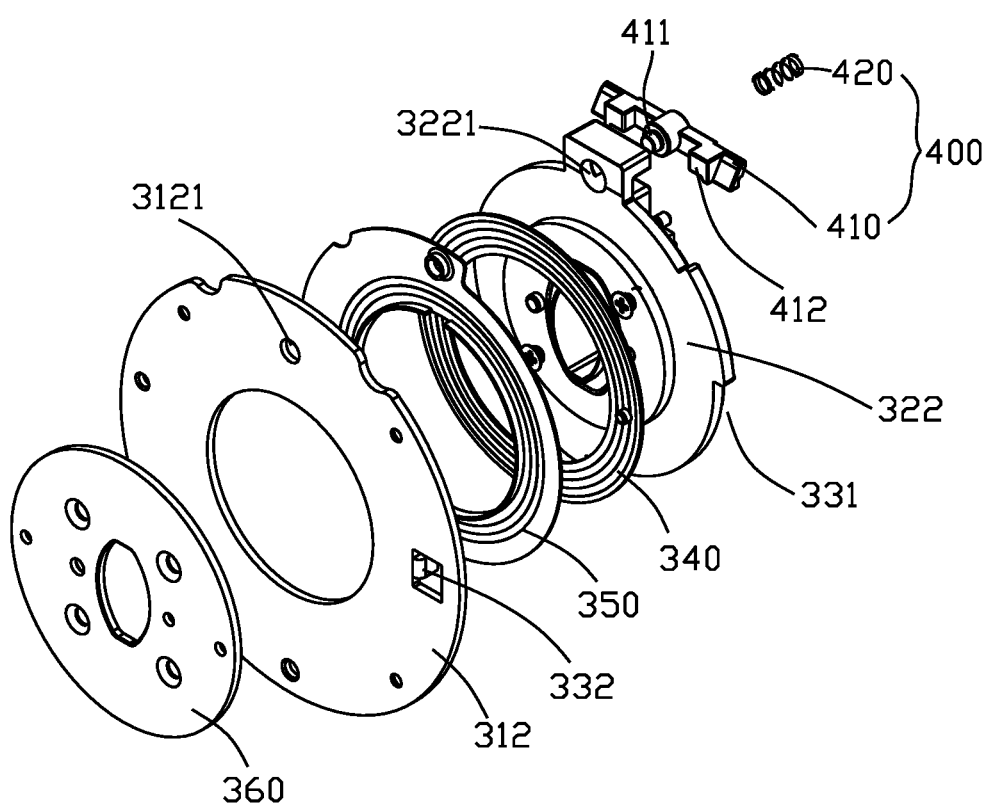
FIG. 6 illustrates a schematic exploded diagram of the connection device (connected to a lock structure) in FIG. 2.

In embodiments of the present disclosure, as shown in FIG. 5 and FIG. 6, the second connection member 320 further includes a connector 322 arranged opposite to the sliding member or the first rotation member. The first connection member 310 includes at least the second rotation member 312. The second rotation member 312 can be connected to the connector 322 and can rotate relative to the connector 322. The second rotation member 312 can be fixedly connected to the first body 100 to cause the first body 100 to rotate relative to the second body 200. Thus, the second type movement can be the rotation around a center line parallel to the Y-axis on the XZ plane.

With reference to FIG. 4 and FIG. 6, to facilitate the setting of the sliding member or the first rotation member, the connector 322 includes a shaft segment 3222. The sliding member or the first rotation member can be arranged at the shaft segment 3222. The sliding member or the first rotation member is not limited to being arranged at the shaft segment 3222.

With still reference to FIG. 4 and FIG. 6, in embodiments of the present disclosure, a rotation limiting structure 330 is arranged between the first connection member 310 and the second connection member 320. The rotation limiting structure 330 can be configured to limit an angle that the first connection member 310 and the second connection member 320 can rotate to cause the first body 100 to rotate within a specified angle relative to the second body 200. In embodiments of the present disclosure, the connector 322 can include an annular protruded edge. The rotation limiting structure 330 can include a gap 331 arranged at the annular protruded edge of the connector 322 and a protrusion 332 arranged at the second rotation member 312. The protrusion 332 can cooperate with the gap 331 to limit the angle at which the first connection member 310 and the second connection member 320 can rotate. In some embodiments, the rotation limiting structure 330 can also be a coil spring or a torsion spring arranged between the second rotation member 312 and the connector 322. The rotation angle between the second rotation member 312 and the connector 322 can be limited by the coil spring or the torsion spring. Thus, the rotation angle between the first connection member 310 and the second connection member 320 can be limited.

In some embodiments of the present disclosure, to reduce the rotation resistance between the second rotation member 312 and the connector 322, a lubricating structure 340 can be arranged between the second rotation member 312 and the connector 322.

In some embodiments, the lubricating structure 340 is not limited and can be a bearing or an annular groove arranged at the sheet-shaped body. The lubricating oil can be stored in the annular groove. Thus, a gasket 350 can be arranged on the sheet-shaped body. The gasket 350 can be configured to cover the annular groove to avoid leakage of the lubricating oil.

Further, the second rotation member 312 can also be connected to a position-limiting member 360. The position-limiting member 360 can be configured to limit the movement of the second rotation member 312 in a perpendicular direction perpendicular to the rotation direction.

In some embodiments, the structure of the position-limiting member 360 is not limited. The structure of the position-limiting member 360 can be a circular body or a square body.

In some embodiments of the present disclosure, to reduce the rotation resistance between the second rotation member 312 and the position-limiting member 360, the lubricating structure can also be arranged between the second rotation member 312 and the position-limiting member 360.

With reference to FIG. 5 and FIG. 6, in some embodiments of the present disclosure, to ensure that the first body 100 stops after moving relative to the second body 200 to have the first relative position relationship to realize the second type movement, the electronic apparatus further includes a lock structure 400 connected to the connection device 300. After the first body 100 moves relative to the second body 200 to have the first relative position relationship, the lock structure 400 can have a first state. In the first state, the lock structure 400 can support the second type movement of the first body 100 through the connection device 300, and/or, before the first body 100 moves relative to the second body 200 to have the first relative position relationship, the lock structure 400 can have a second state. In the second state, the lock structure 400 can restrict the second type movement of the first body 100 relative to the second body 200 through the connection device 300.

In some embodiments, the lock structure 400 can include at least a position-limiting connector 410 and an elastic member 420 corresponding to the position-limiting connector 410. The elastic member 420 can cause the position-limiting connector 410 to be connected to the first connection member 310 and the second connection member 320, or the elastic member 420 can cause the position-limiting connector 410 to be not connected to the first connection member 310. When the position limit connection member 410 is connected to the first connection member 310 and the second connection member 320, the first body 100 cannot perform the second type movement relative to the second body 200. When the position-limiting connector 410 is not connected to the first connection member 310, the first body 100 can perform the second type movement relative to the second body 200.

In some embodiments, the elastic member 420 can cause the position-limiting connector 410 to be connected to the first connection member 310 and the second connection member 320 and also cause the limiting connector 410 to be not connected to the first connection member 310. The structure of the elastic member 420 is not limited. For example, the elastic member 420 can be a spring or a rubber band.

In some embodiments of the present disclosure, the lock structure 400 can include at least one position-limiting connector 410 and at least one elastic member 420 corresponding to the position-limiting connector 410. The elastic member 420 can cause the position-limiting connector 410 to be connected to the first connection member 310 and the second connection member 320. The second body 200 can include a lock auxiliary structure 220 corresponding to the position-limiting connector 410. The lock auxiliary structure 220 can cause the position-limiting connector 410 to be not connected to the first connection member 310. When the position-limiting connector 410 is connected to the first connection member 310 and the second connection member 320, the first body 100 cannot perform the second type movement relative to the second body 200. When the position-limiting connector 410 is not connected to the first connection member 310, the first body 100 can perform the second type movement relative to the second body 200. In some embodiments, the position-limiting connector 410 being connected to the first connection member 310 and the second connection member 320 can be realized by the elastic member 420. The position-limiting connector 410 being not connected to the first connection member 310 can be realized by the lock auxiliary structure 220 and elastic member 420.

In some embodiments, as shown in FIG. 6, the position-limiting connector 410 includes a pin 411. The second rotation member 312 includes a first connection hole 3121. The connector 322 includes a second connection hole 3221. Before the first body 100 moves relative to the second body 200 to have the first relative position relationship, the elastic member 420 can be compressed between the connector 322 and the second body 200. Under the action of the elastic member 420, a first portion of the pin 411 can be located in the first connection hole 3121, and a second portion of the pin 411 can be located in the second connection hole 3221 (i.e., the whole lock structure 400 being in the second state). Thus, the connector 322 and the second rotation member 312 can be connected integrally to further limit the second type movement of the first body 100 relative to the second body 200. After the first body 100 moves relative to the second body 200 to have the first relative position relationship, based on the push of the lock auxiliary structure 220, the first portion of the pin 411 can be detached from the first connection hole 3121 (i.e., the whole lock structure 400 being in the first state). Thus, the connector 322 can be detached from the second rotation member 312 to support the first body 100 to perform the second type movement through the connection device 300.

To cause the whole lock structure 400 to switch from the second state to the first state after the first body 100 moves relative to the second body 200 to have the first relative position relationship, the lock auxiliary structure 220 can include a first inclined surface 221. The position-limiting connector 410 can include a second inclined surface 412 corresponding to the first inclined surface 221. Through the cooperation between the first inclined surface 221 and the second inclined surface 412, the lock structure 400 can be switched from the second state to the first state. In some embodiments, the second body 200 can include a position-limiting hole 202 communicating with the sliding chute 201. The position-limiting hole 202 can be configured to define the first relative position relationship between the first body 100 and the second body 200. The lock auxiliary structure 220 can be arranged on an end of the position-limiting hole 202 away from the sliding chute 201.

In some embodiments of the present disclosure, the lock structure 400 can include at least one position-limiting connector 410, an elastic member 420 corresponding to the position-limiting connector 410, and a lock auxiliary structure 220 corresponding to the position-limiting connector 410 connected to the second body 200. The elastic member 420 can be sleeved at the pin 411. Thus, the position-limiting connector 410 can be connected to the first connection member 310 and the second connection member 320, or the position-limiting connector 410 cannot be connected to the first connection member 310. The lock auxiliary structure 220 can include the first inclined surface 221 fixedly arranged relative to the second body 200. The position-limiting connector 410 can include the second inclined surface 412 corresponding to the first inclined surface 221. Through the cooperation between the first inclined surface 221 and the second inclined surface 412, after the first body 100 moves relative to the second body 200 to have the first relative position relationship, the lock auxiliary structure 220 can provide an auxiliary pushing effect in a process of causing the position-limiting connector 410 to be not connected to the first connection member 310 by the elastic member 420. The lock auxiliary structure 220 may not be arranged at the second body 200, and the position-limiting connector 410 can include an auxiliary structure. After the first body 100 moves relative to the second body 200 to have the first relative position relationship, the auxiliary structure can directly contact or move relative to the second body 200 to provide an auxiliary pushing effect in the process of causing the position-limiting connector 410 to be not connected to the first connection member 310 by the elastic member 420.

In some embodiments, the lock structure 400 is not limited to a structure of combining the position-limiting connector 410 and the elastic member 420. The lock structure 400 can also have an elastic restoration structure arranged at an annular protruded edge, as long as the lock structure 400 can have the first state and the second state. In the first state, the lock structure 400 can support the second type movement of the first body 100 through the connection device 300. In the second state, the lock structure 400 can limit the second type movement of the first body relative to the second body 200 through the connection device 300.

In some embodiments of the present disclosure, the electronic apparatus can further include a prompt structure 500. After the first body 100 moves relative to the second body 200 to have the first relative position relationship, the prompt structure 500 can trigger a feedback prompt to prompt to reach a specified position.

In embodiments of the present disclosure, the feedback prompt is not limited. For example, the feedback prompt can be provided through sound. For another example, the feedback prompt can be provided through touch feeling. For another example, the feedback prompt can be provided through sound and touch feeling.

Figure 7:
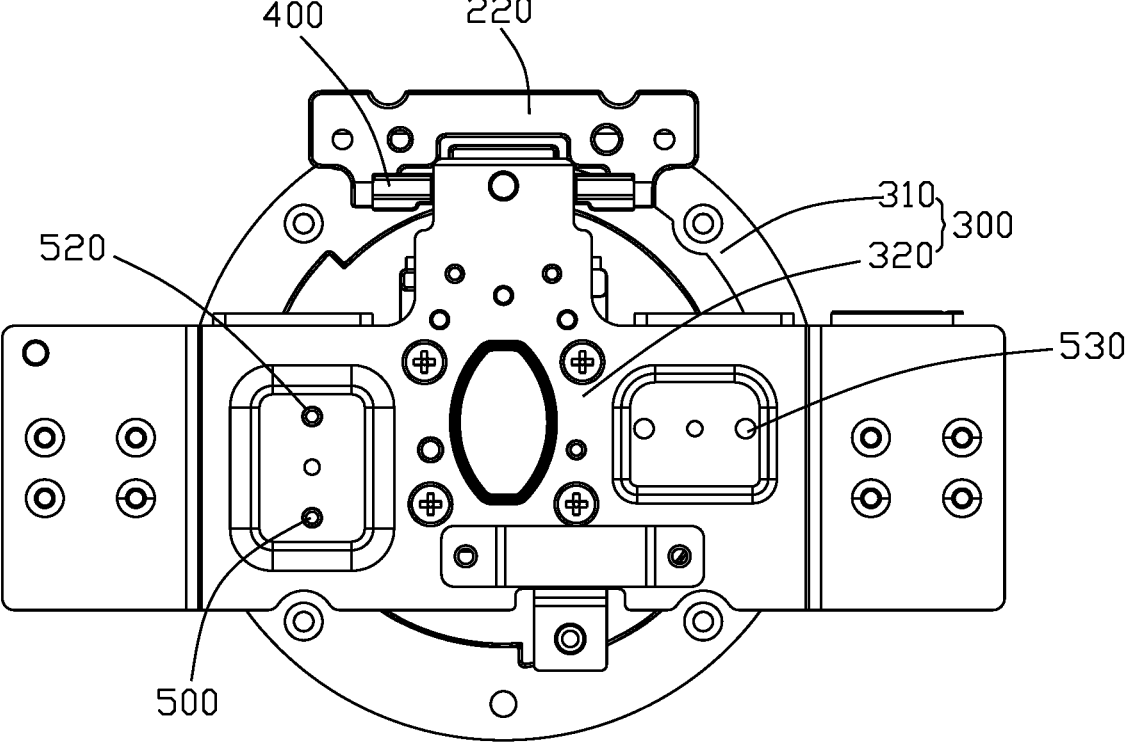
FIG. 7 illustrates a schematic structural diagram of the connection device (connected to a lock structure) in FIG. 2.

In embodiments of the present disclosure, the prompt structure 500 is not limited. In some embodiments, as shown in FIG. 7 and FIG. 8, the prompt structure 500 includes a first elastic pin 510 arranged at the second body 200, and a first latch hole 520 corresponding to the first elastic pin 510 arranged at the sliding connector 321. Before the first body 100 moves relative to the second body 200 to have the first relative position relationship, the first elastic pin 510 can be compressed between the second body 200 and the sliding connector 321. After the first body 100 moves relative to the second body 200 to have the first relative position relationship, the first elastic pin 510 can restore to be snapped into the first latch hole 520 of the sliding connector 321. Through the cooperation between the first elastic pin 510 and the first latch hole 520, on one hand, a click sound can be generated when the first elastic pin 510 being snapped in the first latch hole 520, and on another hand, before and after the first elastic pin 510 is snapped into the first latch hole 520, different touch feelings can be provided. Thus, the feedback prompt can be provided through the sound and the touch feeling.

The position where the first lock hole 520 is arranged is not limited to be at the sliding connector 321, as long as the first lock hole 520 is arranged at a structure that can move with the first body 100 relative to the second body 200 to have the first relative position relationship. For example, the first lock hole 520 can also be arranged at the connector 322.

In some embodiments, the cooperation between the first elastic pin 510 and the first latch hole 520 can be mainly used to prompt that the first body 100 moves relative to the second body 200 to have the first relative position relationship. Further, the sliding connector 321 can include a second latch hole 530. Correspondingly, the second rotation member 312 can include a second elastic pin (the second elastic pin being not shown in the figure). After the first body 100 moves relative to the second body 200 to have the first relative position relationship, and in the process of the first body 100 performing the second type movement relative to the second body 200, the second elastic pin can be compressed between the second rotation member 312 and the sliding connector 321. After the first body 100 moves from the first posture to the second posture relative to the second body 200, the second elastic pin can restore and can be snapped into the second latch hole 530 of the sliding connector 321. Through the cooperation of the second elastic pin and the second latch hole 530, on one hand, a click sound can be generated when the second elastic pin is snapped in. On another hand, before and after the second elastic pin 520 is snapped into the second latch hole 530, different touch feelings can be provided. Thus, the feedback prompt can be provided through sound and touch feeling to prompt that the first body 100 moves to the second posture relative to the second body 200.

Similarly, a setting position of the second latch hole 530 is not limited to the sliding connector 321, as long as the second latch hole 530 is arranged at a structure that moves with the first body 100 relative to the second body 200 to have the first relative position relationship. For example, the second latch hole 530 can also be arranged at the connector 322.

In some embodiments of the present disclosure, after the first body 100 moves relative to the second body 200 to have the first relative position relationship, the lock structure 400 can trigger the feedback prompt to prompt that the first body 100 reaches the specified position. Therefore, the lock structure 400 can have the prompt function. For example, the first portion of the pin 411 of the position-limiting connector 410 can provide different touch feelings when being located in the first connection hole 3121 and disengaged from the first connection hole 3121 to cause the lock structure 400 to have the prompt function.

In some embodiments of the present disclosure, after the first body 100 moves relative to the second body 200 to have the first relative position relationship, the lock structure 400 can trigger the feedback prompt to prompt that the first body 100 reaches the specified position. Thus, the lock structure 400 can have the prompt function. Meanwhile, the electronic apparatus can also include an additional prompt structure 500. After the first body 100 moves relative to the second body 200 to have the first relative position relationship, the additional prompt structure 500 can trigger the feedback prompt to prompt that the first body 100 reaches the specified position.

In some embodiments of the present disclosure, the second body 200 can be configured to place the electronic apparatus on a carrying surface. When the first body 100 moves relative to the second body 200 to have a second relative position relationship, the second type movement can also be realized through the connection device 300. A height of the first body 100 relative to the carrying surface when the first body 100 is in the second relative position relationship relative to the second body 200 can be greater than a height of the first body 100 in the first relative position relationship, and/or, an included angle of the first body 100 relative to the carrying surface in the second relative position relationship relative to the second body 200 can be smaller or larger than an included angle of the first body 100 in the first relative position relationship. Based on this, the problem of the first body 100 colliding with the carrying surface due to insufficient rotation space in the landscape posture can be avoided. Thus, an application form can be further added to improve the adaptability of the electronic apparatus.

In some embodiments, two or more position-limiting holes 202 can be arranged at intervals along the Z-axis direction at the second body 200. The position-limiting holes 202 can include a first position-limiting hole and a second position-limiting hole. The first position-limiting hole can be configured to realize that the first body 100 moves relative to the second body 200 to have the first relative position relationship. The second position-limiting hole can be configured to realize that the first body 100 moves relative to the second body 200 to have the second relative position relationship.

In some embodiments, the connection device 300 can include a rotation structure that causes the first body 100 to rotate relative to the second body 200 around a center line parallel to the X-axis. Based on the rotation structure, the first body 100 can rotate relative to the second body 200 from the first relative position relationship to the second relative position relationship. When the first body 100 has the first relative position relationship relative to the second body 200, the first body 100 can have the first angle relative to the carrying surface. When the first body 100 has the second relative position relationship relative to the second body 200, the first body 100 can have a second angle relative to the carrying surface. The second angle can be smaller or larger than the first angle.

In the description of the present disclosure, the orientation or position relationship indicated by a location word is usually based on an orientation or position relationship shown in the drawings, and is only to facilitate the description of the present disclosure or simplification of the description. Without otherwise specified, the location word does not indicate and imply that the device or element must have a specified orientation or be constructed or operated in the specified orientation. Therefore, the location word does not limit the scope of the present disclosure. The location words "inside" and "outside" can indicate inside or outside of the profiles of the members.

To facilitate description, spatially relative terms such as "on," "over," "on an upper surface," and "above" can be used to describe one or more members or spatial position relationship between the features and the other members or features shown in the drawings. The spatial relative term can include the orientation of the member described in the drawings and different orientations being used or operated. For example, if the member in the drawing is shown upside down, the member being above the other members or features or over the other members or features can include the member being below the other members or construction or under the other members or construction. Thus, the exemplary term "above" can include "above" and "under." In addition, the members or features can be positioned at other different angles (e.g., rotated 90 degrees or other angles), which are included in the present disclosure.

The terms used herein are only used to describe specific embodiments and are not intended to limit exemplary embodiments according to the present disclosure. As used herein, unless otherwise specified in the context, the singular is intended to include the plural. In addition, when the terms "comprising" and/or "including" are used in the specification, the terms can indicate an existence of a feature, a step, an operation, a member, an assembly, and/or a combination thereof.

The terms "first" and "second" in the specification and claims of the present disclosure and the above drawings can be used to distinguish similar objects, but are not necessarily used to describe a specific sequence or order. The data used here can be interchangeable under appropriate situations. Thus, embodiments of the disclosure described herein can be implemented in a sequence other than those illustrated or described here.

The present disclosure has been described through the above embodiments. However, the above embodiments are only used for illustration and description and are not intended to limit the present disclosure to the scope of the described embodiments. In addition, those skilled in the art can understand that the present disclosure is not limited to the above embodiments. More variations and modifications can be made according to the teachings of the present disclosure, and these variations and modifications can all be within the scope of the present disclosure. The scope of the present invention is defined by the appended claims and their equivalent scope.

What is claimed is:

1. An electronic apparatus, comprising:
a first body;
a second body configured to place the electronic apparatus on a carrying surface;
a connection device connected to the first body and the second body and configured to realize a first type movement and a second type movement of the first body relative to the second body, the first type movement comprising a movement in a direction of an axis perpendicular to the carrying surface, the second type movement comprising a rotation around a center line parallel to the carrying surface, the connection device including a first connection member connected to the first body and a second connection member connected to the second body, the first connection member having a first connection hole, the second connection member including a connector having a second connection hole; and
a lock structure comprising at least one position-limiting connector and an elastic member,
wherein, after the first body moves relative to the second body to have a first relative position relationship, the second type movement is realized through the connection device,
wherein the first relative position relationship is a first distance relationship in which the first body ascends relative to the second body to a specified distance from the carrying surface, and
wherein before the first body ascends relative to the second body so that the first body and the second body have the first relative position relationship, the elastic member is compressed between the connector and the second body, the elastic member biases the position-limiting connector to simultaneously engage the first and second connection holes to mechanically couple the first connection member and the connector, such that the lock structure has a second state to prevent the second type movement of the first body relative to the second body through the connection device by the position-limiting connector simultaneously engaging the first and second connection holes, and
after the first body ascends relative to the second body to have the first relative position relationship, the lock structure has a first state, and in the first state, the lock structure can support the second type movement of the first body through the connection device.

2. The electronic apparatus according to claim 1, wherein:
a difference between the second type movement and the first type movement includes a different movement direction, a different movement mode, or a different movement direction and a different movement mode; and
the first relative position relationship includes a distance relationship, an angle relationship, or a position of a center of gravity of the second body.

3. The electronic apparatus according to claim 1, wherein:
the second connection member performs the first type movement relative to the second body to cause the first body to perform the first type movement relative to the second body; and
the first connection member performs the second type movement relative to the second body to cause the first body to perform the second type movement relative to the second body.

4. The electronic apparatus according to claim 3, wherein:
the second connection member includes at least one sliding member, the second body includes a sliding auxiliary structure corresponding to the at least one sliding member, and the second connection member slides relative to the second body through a cooperation between the at least one sliding member and the sliding auxiliary structure; or
the second connection member includes at least one first rotation member, the second body includes a rotation auxiliary structure corresponding to the at least one first rotation member, and the second connection member rotates relative to the second body through cooperation between the at least one first rotation member and the rotation auxiliary structure.

5. The electronic apparatus according to claim 4, wherein:
the sliding auxiliary structure includes a sliding chute arranged at the second body or a sliding track arranged at the second body;
the at least one sliding member includes a sliding connector slidingly connected to the sliding track or a convex member or a concave member arranged corresponding to the sliding chute; and
the second connection member slides relative to the second body through a cooperation between the convex member or the concave member and the sliding chute or through a cooperation between the sliding connector and the sliding track.

6. The electronic apparatus according to claim 5, wherein:
the sliding chute includes a first chute wall and a second chute wall opposite to each other; and
two sliding members are provided and slidingly cooperated with the first chute wall and the second chute wall, respectively.

7. The electronic apparatus according to claim 4, wherein:
the connector is arranged oppositely to the at least one sliding member or the at least one first rotation member; and
the first connection member includes at least a second rotation member, the second rotation member being connected to the connector and rotates relative to the connector, and the second rotation member being fixedly connected to the first body to cause the first body to rotate relative to the second body.

8. The electronic apparatus according to claim 3, wherein a rotation position-limiting structure is provided between the first connection member and the second connection member, the rotation position-limiting structure being configured to limit an angle in which the first connection member and the second connection member is able to rotate to cause the first body to rotate within a specified angle relative to the second body.

9. The electronic apparatus according to claim 1, wherein the elastic member corresponds to the position-limiting connector and causes the position-limiting connector to be connected to the first connection member and the second connection member of the connection device or causes the position-limiting connector to be not connected to the first connection member of the connection device, wherein:

when the position-limiting connector is connected to the first connection member and the second connection member, the first body is not able to perform the second type movement relative to the second body; and when the position-limiting connector is not connected to the first connection member, the first body is able to perform the second type movement relative to the second body.

10. The electronic apparatus according to claim 9, wherein:

the second body includes a lock auxiliary structure corresponding to the position-limiting connector and causing the position-limiting connector to be not connected to the first connection member;

the position-limiting connector being connected to the first connection member and the second connection member is realized by the elastic member; and the position-limiting connector being not connected to the first connection member is realized by the lock auxiliary structure and elastic member.

11. The electronic apparatus according to claim 1, further comprising a prompt structure, wherein:

after the first body moves relative to the second body to have the first relative position relationship, the prompt structure triggers a feedback prompt to prompt that the first body arrives at a specified position; or after the first body moves relative to the second body to have the first relative position relationship, the lock structure triggers the feedback prompt to prompt that the first body arrives at the specified position.

12. The electronic apparatus according to claim 1, wherein:

the second body is configured to place the electronic apparatus on a carrying surface;

in response to the first body moving relative to the second body to have a second relative position relationship, the second type movement is also realized through the connection device;

a height of the first body relative to the carrying surface in the second relative position relationship relative to the second body is greater than the height in the first relative position relationship; or an included angle of the first body relative to the carrying surface in the second relative position relationship relative to the second body is smaller or larger than an included angle in the first relative position relationship.

13. The electronic apparatus according to claim 1, wherein in the first state, the lock structure can support the second type movement by disengaging the position-limiting connector from the first connection member via a lock auxiliary structure fixed to the second body, and the lock auxiliary structure includes a first inclined surface that cams against a second inclined surface of the position-limiting connector when the first body reaches the first relative position relationship.

14. The electronic apparatus according to claim 1, wherein the second body includes a sliding chute arranged at the second body, the second body includes a position-limiting hole communicating with the sliding chute, the position-limiting hole is configured to define the first relative position relationship between the first body and the second body, and the lock auxiliary structure is arranged on an end of the position-limiting hole away from the sliding chute.

15. The electronic apparatus according to claim 14, wherein the lock auxiliary structure includes a first inclined surface, the position limiting connector includes a second inclined surface corresponding to the first inclined surface, and through cooperation between the first inclined surface and the second inclined surface the lock structure is switched from the second state to the first state when the first body reaches the first relative position relationship.

16. An electronic apparatus, comprising:

a first body;

a second body;

a connection device connected to the first body and the second body and configured to realize a first type movement and a second type movement of the first body relative to the second body, the first type movement comprising a movement in a direction of an axis perpendicular to the carrying surface, the second type movement comprising a rotation around a center line parallel to the carrying surface, the connection device including a first connection member connected to the first body and a second connection member connected to the second body, the first connection member having a first connection hole, the second connection member including a connector having a second connection hole; and a lock structure connected to the connection device, the lock structure comprising at least one position-limiting connector and an elastic member, wherein, after the first body ascends relative to the second body to a specified distance from a carrying surface, the second type movement is realized through the connection device, wherein before the first body ascends relative to the second body to the specified distance from the carrying surface so that the first body and the second body have a first relative position relationship, the elastic member is compressed between the connector and the second body, the elastic member biases the at least one position-limiting connector to simultaneously engage the first connection hole of the first connection member and the second connection hole of the connector, such that the lock structure has a second state to prevent the second type movement of the first body relative to the second body through the connection device by the position-limiting connector simultaneously engaging the first and second connection holes, and after the first body ascends relative to the second body to have the first relative position relationship, the lock structure has a first state, and in the first state, the lock structure can support the second type movement of the first body through the connection device, wherein the second connection member includes at least one sliding member, and the second body includes a sliding auxiliary structure corresponding to the at least one sliding member, and wherein the sliding auxiliary structure includes a sliding chute arranged at the second body, the sliding chute includes a first chute wall and a second chute wall opposite to each other, and two separate sliding blocks of the at least one sliding member are provided and slidingly cooperated with the first chute wall and the second chute wall, respectively.

17. The electronic apparatus according to claim 16, wherein:

a difference between the second type movement and the first type movement includes a different movement direction, a different movement mode, or a different movement direction and a different movement mode; and the first relative position relationship includes a distance relationship, an angle relationship, or a position of a center of gravity of the second body.

18. An electronic apparatus, comprising:

a first body;

a second body configured to place the electronic apparatus on a carrying surface;

a connection device connected to the first body and the second body and configured to realize a first type movement and a second type movement of the first body relative to the second body, the first type movement comprising an angular movement in an XZ plane relative to a reference line parallel to a Z axis, the second type of movement comprising a rotation around a center line parallel to a Y axis in the XZ plane, the XZ plane being jointly defined by an X axis and the Z axis, the X axis, the Y axis, and the Z axis being perpendicular to each other, the connection device including a first connection member connected to the first body and a second connection member connected to the second body, the first connection member having a first connection hole, the second connection member including a connector having a second connection hole; and a lock structure comprising at least one position-limiting connector and an elastic member, wherein, after the first body moves relative to the second body to have a first relative position relationship, the second type movement is realized through the connection device, wherein the first relative position relationship is a first distance relationship in which the first body ascends relative to the second body to a specified distance from the carrying surface, and wherein before the first body ascends relative to the second body so that the first body and the second body have the first relative position relationship, the elastic member is compressed between the connector and the second body, the elastic member biases the position-limiting connector to simultaneously engage the first and second connection holes to mechanically couple the first connection member and the connector, such that the lock structure has a second state to prevent the second type movement of the first body relative to the second body through the connection device by the position-limiting connector simultaneously engaging the first and second connection holes, and after the first body ascends relative to the second body to have the first relative position relationship, the lock structure has a first state, and in the first state, the lock structure can support the second type movement of the first body through the connection device.

19. The electronic apparatus according to claim 18, wherein the X axis and the Y axis jointly define an XY plane that is parallel to the carrying surface.

\* \* \* \* \*